US010175350B1

(12) United States Patent
Tsokos et al.

(10) Patent No.: US 10,175,350 B1
(45) Date of Patent: Jan. 8, 2019

(54) SYSTEMS AND METHODS FOR DETECTING BURIED OBJECTS

(71) Applicants: University of South Florida, Tampa, FL (US); University of the Sciences in Philadelphia, Philadelphia, PA (US)

(72) Inventors: Chris P. Tsokos, Tampa, FL (US); Abolfazl Saghafi, Philadelphia, PA (US); Sajad Jazayeri, Tampa, FL (US); Sanaz Esmaeili, Tampa, FL (US)

(73) Assignees: University of South Florida, Tampa, FL (US); University of the Sciences in Philadelphia, Philadelphia, PA (US)

( * ) Notice: Subject to any disclaimer, the term of this patent is extended or adjusted under 35 U.S.C. 154(b) by 0 days.

(21) Appl. No.: 16/021,928

(22) Filed: Jun. 28, 2018

(51) Int. Cl.
*G01V 3/12* (2006.01)
*G01S 13/42* (2006.01)
*G01S 13/88* (2006.01)

(52) U.S. Cl.
CPC .......... *G01S 13/885* (2013.01); *G01S 13/426* (2013.01); *G01V 3/12* (2013.01)

(58) Field of Classification Search
CPC ...... G01S 13/88; G01S 13/885; G01S 13/887; G01S 13/888; G01V 3/12
USPC .......................................................... 342/22
See application file for complete search history.

(56) References Cited

U.S. PATENT DOCUMENTS

| | | | | |
|---|---|---|---|---|
| 6,335,624 B1* | 1/2002 | Berthier | ................... | G01V 3/12 324/326 |
| 7,173,560 B2* | 2/2007 | Li | ......................... | F41H 11/12 324/326 |
| 7,320,271 B2* | 1/2008 | Hintz | .................... | G01S 7/2923 342/22 |
| 8,194,250 B2* | 6/2012 | Morgan | .................. | G01S 13/89 342/191 |
| 2003/0076254 A1* | 4/2003 | Witten | ...................... | G01S 7/28 342/22 |
| 2004/0168358 A1 | 9/2004 | Stump | | |
| 2005/0156776 A1* | 7/2005 | Waite | ...................... | G01V 3/12 342/22 |

(Continued)

FOREIGN PATENT DOCUMENTS

KR 101364759 B1 2/2014

OTHER PUBLICATIONS

S. Shihab, Waleed Al-Nuaimy, Yi Huang, Asger Eriksen, Neural network target identifier based on statistical features of GPR signals, Proc. SPIE 4758, Ninth International Conference on Ground Penetrating Radar, (Apr. 12, 2002); 135-138.

(Continued)

*Primary Examiner* — Peter M Bythrow
(74) *Attorney, Agent, or Firm* — Thomas | Horstemeyer, LLP

(57) ABSTRACT

In one embodiment, a method for detecting buried objects includes receiving ground penetrating radar (GPR) signals captured at discrete locations along a surface of a medium in which an object may be buried, computing parameters based on the received GPR signals that are indicative of the proximity of a buried object, plotting the computed parameters as a function of location, determining an apex of a hyperbola that results from the plotting of the computed parameters, and designating a location at which the apex occurs as an estimated location of the buried object.

15 Claims, 11 Drawing Sheets

(56) References Cited

U.S. PATENT DOCUMENTS

| | | | | |
|---|---|---|---|---|
| 2006/0055584 | A1* | 3/2006 | Waite | G01S 13/86 |
| | | | | 342/22 |
| 2010/0315280 | A1* | 12/2010 | Bakhtar | G01S 13/02 |
| | | | | 342/22 |
| 2013/0082860 | A1* | 4/2013 | Paglieroni | G01S 13/90 |
| | | | | 342/22 |
| 2013/0082870 | A1* | 4/2013 | Chambers | G01S 13/90 |
| | | | | 342/25 A |
| 2014/0079248 | A1* | 3/2014 | Short | G10L 21/0272 |
| | | | | 381/119 |
| 2014/0104094 | A1* | 4/2014 | Feigin | B41J 3/36 |
| | | | | 342/22 |
| 2015/0268218 | A1* | 9/2015 | Troxler | G01S 13/0209 |
| | | | | 342/21 |
| 2016/0097879 | A1* | 4/2016 | Stolarczyk | H04W 4/046 |
| | | | | 342/22 |
| 2016/0260222 | A1* | 9/2016 | Paglieroni | G06T 7/11 |
| 2018/0052229 | A1* | 2/2018 | Ranney | G01S 7/025 |

OTHER PUBLICATIONS

Xiaoyin Xu, Eric L. Miller, Statistical method to localize buried landmines from GPR array measurement, Proc. SPIE 4394, Detection and Remediation Technologies for Mines and Minelike Targets VI, (Oct. 18, 2001), 742-753.

Abolfazl Saghafi, et al., Real-time object detection using Power Spectral Density of Ground Penetrating Radar Data, Preprint submitted to Construction and Building Materials, (Feb. 26, 2018), 1-7.

Richard Zuech, et al., Intrusion detection and Big Heterogeneous Data: a Survey, Journal of Big Data, (2015) 2:3, 1-41.

X. Zeng, G. A. McMechan, GPR characterization of buried tanks and pipes, Geophysics 62 (3) (1997) 797-806.

E. Pettinelli, A. Di Matteo, E Maffei, L. Crocco, F. Soldovieri, J. D. Redman, A. P. Annan, GPR response from buried pipes: Measurement on field site and tomographic reconstructions, IEEE Transactions on Geoscience and Remote Sensing 47 (8) (2009) 2639-2645.

J. F. Sham, W. W. Lai, Development of a new algorithm for accurate estimation of GPR's wave propagation velocity by common-offset survey method, NDT & E International 83 (2016) 104-113.

S. Jazayeri, A. Klotzsche, S. Kruse, Improving estimates of buried pipe diameter and infilling material from GPR profiles with full waveform inversion using PEST, Geophysics, revised, pending acceptance. Geophysics, 83(4) (2018), H27:H-41.

W. Al-Nuaimy, Y. Huang, M. Nakhkash, M. Fang, V. Nguyen, A. Eriksen, Automatic detection of buried utilities and solid objects with GPR using neural networks and pattern recognition, Journal of applied Geophysics 43 (2) (2000) 157-165.

S. Birkenfeld, Automatic detection of reflexion hyperbolas in GPR data with neural networks, in: World Automation Congress (WAC), 2010, IEEE, 2010, pp. 1-6.

C. Maas, J. Schmalzl, Using pattern recognition to automatically localize reflection hyperbolas in data from ground penetrating radar, Computers & geosciences 58 (2013), 116-125.

E. Pasolli, F. Melgani, M. Donelli, R. Attoui, M. De Vos, Automatic detection and classification of buried objects in GPR images using genetic algorithms and support vector machines, in: Geoscience and Remote Sensing Symposium, 2008. IGARSS 2008. IEEE International, vol. 2, IEEE, 2008, pp. II-525: II-528

Q. Lu, J. Pu, Z. Liu, Feature extraction and automatic material classification of underground objects from ground penetrating radar data, Journal of Electrical and Computer Engineering, 2014 (2014) 28, 11 pages.

L. Qiao, Y. Qin, X. Ren, Q. Wang, Identification of buried objects in GPR using amplitude modulated signals extracted from multiresolution monogenic signal analysis, Sensors 15 (12) (2015), 30340-30350.

W. Li, X. Cui, L Guo, J. Chen, X. Chen, X. Cao, Tree root automatic recognition in ground penetrating radar profiles based on randomized hough transform, Remote Sensing 8 (5) (2016) 430, 1-16.

Q. Dou, L. Wei, D. R. Magee, A. G. Cohn, Real-time hyperbola recognition and fitting in gpr data, IEEE Transactions on Geoscience and Remote Sensing 55 (1) (2017), 51-82.

S. Jazayeri, A. Ebrahimi, S. Kruse, Sparse blind deconvolution of common-offset GPR data, in: SEG Technical Program Expanded Abstracts 2017, Society of Exploration Geophysicists, 2017, 5140-5145.

C. Warren, A. Giannopoulos, I. Giannakis, gprMax open source software to simulate electromagnetic wave propagation for ground penetrating radar, Computer Physics Communications 209 (2016), 163-170.

C. A. Ratanamahatana, E. Keogh, Everything you know about dynamic time warping is wrong, in: Third Workshop on Mining Temporal and Sequential Data, Citeseer, 2004, 1-11.

D. J. Berndt, J. Clifford, Using dynamic time warping to find patterns in time series., in: KDD workshop, vol. 10, Seattle,WA, 1994, pp. 359-370.

Y. Cao, N. Rakhilin, P. H. Gordon, X. Shen, E. C. Kan, A real-time spike classification method based on dynamic time warping for extracellular enteric neural recording with large waveform variability, Journal of neuroscience methods 261 (2016) 97-109.

A. Kaczmarek, M. Staworko, Application of dynamic time warping and cepstrograms to text-dependent speaker verification, in: Signal Processing Algorithms, Architectures, Arrangements, and Applications Conference Proceedings (SPA), 2009, IEEE, 2009, pp. 169-174.

Z. Hui-lin, T. T Mao, C. Xiao-li, Feature extraction and classification of echo signal of ground penetrating radar, Wuhan University Journal of Natural Sciences 10 (6) (2005) 1009-1012.

C. G. Windsor, L. Capineri, P. Falorni, The estimation of buried pipe diameters by generalized hough transform of radar data, PIERS Online 1 (3)(2005) 345-349.

A. Dell'Acqua, A. Sarti, S. Tubaro, L. Zanzi, Detection of linear objects in gpr data, Signal Processing 84 (4) (2004) 785-799.

S. Jazayeri, A. Saghafi, S. Esmaeili, C. P. Tsokos, Online object detection using Dynamic Time Warping on common-Offset GPR, Under Review. Physics and Statistics. 1-6.

A. Gholami, M. D. Sacchi, A fast and automatic sparse deconvolution in the presence of outliers, IEEE Transactions on Geoscience and Remote Sensing 50 (10) (2012) 4105-4116.

H. Ahmadi, Z. Khaksar, Using power spectral density for fault diagnosis of belt conveyor electromotor, Innovative Computing Technology (2011) 15-20.

K. Mollazade, H. Ahmadi, M. Omid, R. Alimardani, An intelligent combined method based on power spectral density, decision trees and fuzzy logic for hydraulic pumps fault diagnosis, International Journal of Intelligent Systems and Technologies 3 (4) (2008) 251-263.

M. Rucka, K. Wilde, Ultrasound monitoring for evaluation of damage in reinforced concrete, Bulletin of the Polish Academy of Sciences Technical Sciences 63 (1) (2015) 65-75.

A. Moosavian, H. Ahmadi, A. Tabatabaeefar, Condition monitoring of engine journal bearing using Power Spectral Density and support vector machine, Elixir International Journal 43 (2012) 6631-6635.

O. Solomon Jr, PSD computations using Welch's method, NASA STI/Recon Technical Report N 92. (1991) 1-54.

K. K. Parhi, M. Ayinala, Low-complexity welch power spectral density computation, IEEE Transactions on Circuits and Systems I: Regular Papers 61 (1) (2014) 172-182.

\* cited by examiner

SYSTEMS AND METHODS FOR DETECTING BURIED OBJECTS

BACKGROUND

Ground penetrating radar (GPR) is a popular modality for use in locating buried objects because of its non-destructive utilization and fast data collection. Unfortunately, manual processing of the accumulated data is typically required to locate an object, which can be time-consuming and requires skill. In applications in which there is an abundance of possible objects, such as detecting rebar reinforcement in foundation construction and locating utilities, it can be especially challenging to locate the objects using GPR.

Various approaches have been developed with the goal of automating object location using GPR. For example, neural networks and image processing-based pattern recognition methods have been reported as being useful for this purpose, but they are sensitive to noise and fail to perform adequately in the presence of incomplete or highly disturbed hyperbolic patterns. Needed are systems and methods that automate the processing of GPR data and provide accurate and reliable estimates as to the location and depth of buried objects.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, there is a need for systems and methods that automate the processing of ground penetrating radar (GPR) data and provide accurate and reliable estimates as to the location and depth of buried objects. Disclosed herein are examples of such systems and methods. In one embodiment, a system comprises a GPR device that captures GPR signals at various locations along the surface of a medium (e.g., ground) and automatically estimates the location of objects buried in the medium based upon the captured signals. In some embodiments, a maximum energy value, such as the power spectral density (PSD), is determined in real time for each location at which a GPR signal is captured. This maximum energy value is monitored as the GPR data is collected and significant increases in the value indicate the likely presence of a buried object. In some embodiments, the location of the object is estimated to be the location at which an apex occurs for a hyperbola that results from plotting the maximum energy values as a function of location. Once the location of the object has been determined, the depth of the object can be estimated by first estimating a velocity of the GPR signals at the determined location.

In the following disclosure, various specific embodiments are described. It is to be understood that those embodiments are example implementations of the disclosed inventions and that alternative embodiments are possible. All such embodiments are intended to fall within the scope of this disclosure.

A statistical approach is described in this disclosure that is based on the fundamental idea of monitoring a signal's energy. The disclosed method runs automatically and warns the user of potential burial sites by monitoring changes in the energy of the GPR signals. The method further performs automatic hyperbola mapping as well as, location, velocity, and depth estimation with high accuracy. The analytics run quickly and are robust to low levels of noise, which make them suitable for on-site utilization. As described below, the viability of the method has been confirmed through the use of both synthetic models and real-world test cases.

The PSD of a signal, such as a GPR signal, refers to its spectral energy distribution as a function of frequency. When searching for buried (e.g., underground) objects using GPR, the captured signal is expected to have greater energy as the buried object is approached. This is because a greater number of signal waves are reflected back to the GPR device receiver when the waves impact a buried object. Thus, it is logical that the energy of GPR signals change depending on the distance from buried objects. This concept is the basis for at least some of the disclosed systems and methods.

Figure 1:
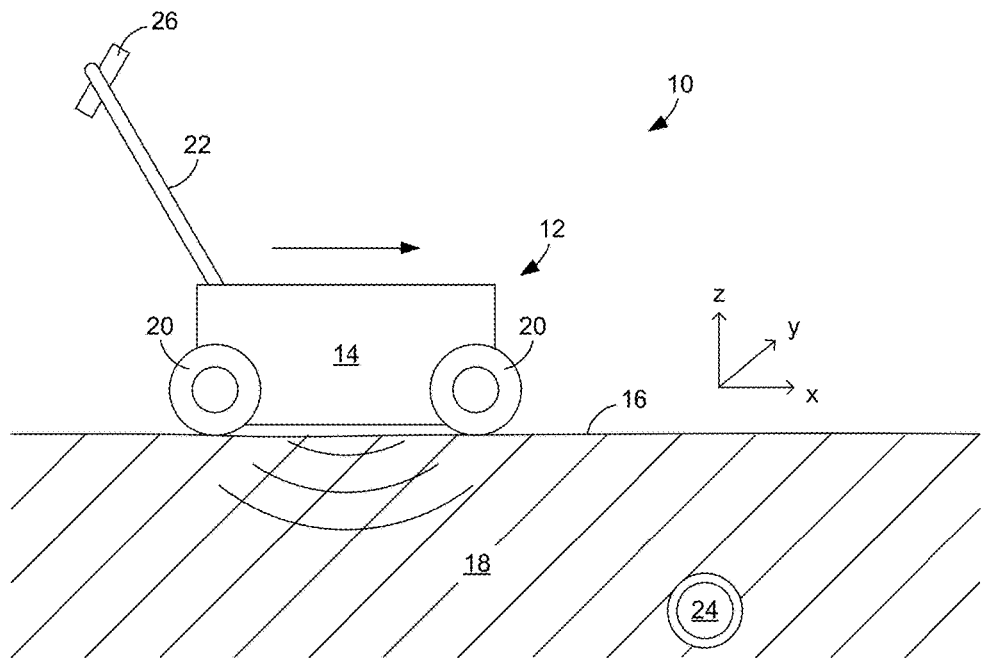
FIG. 1 is a schematic diagram illustrating the capture of ground penetrating radar (GPR) signals using a GPR device.

FIG. 1 illustrates an example system 10 for detecting buried objects. As shown in this figure, the system 10 generally comprises a GPR device 12. In the example of FIG. 1, the GPR device 12 comprises a housing 14 that is supported above a surface 16 of a medium 18, such as the ground, by one or more wheels 20. The GPR device 12 further comprises a handle 22 that can be used to move the device along the surface 16 for the purpose of capturing GPR signals at various locations along the surface. As used herein, the term "location" refers to the position of an object, such as the pipe 24 shown in FIG. 1, along the surface 16 of the medium 18, as opposed to the depth of the object within the medium. With reference to the coordinate system shown in FIG. 1, the location is a position along the x axis while the depth is a position along the z axis (a negative value). With further reference to FIG. 1, the GPR device 12 also comprises a user interface 26 mounted to the handle 22 that can be used to convey optical and/or auditory information to the user of the device, such as an alert that the device is nearing a buried object, an indication of the location of the object, and an indication of the depth of the object. In some embodiments, the user interface 26 includes a display and at least one speaker.

Figure 2:
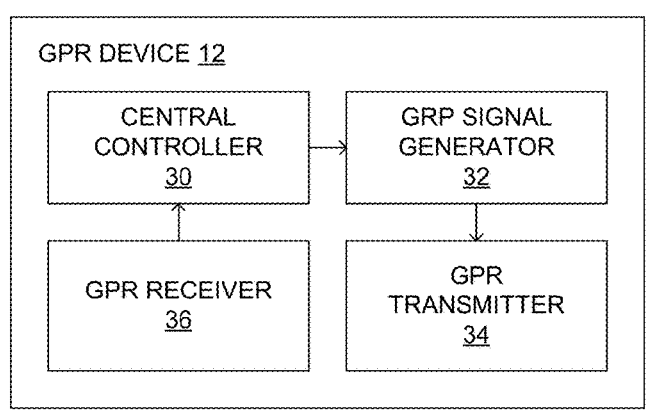
FIG. 2 is a schematic diagram of an embodiment of a configuration for the GPR device shown in FIG. 1.

FIG. 2 illustrates an example configuration for the GPR device 12. As shown in this figure, the GPR device 12 comprises a central controller 30 that controls various components of the device, a GPR signal generator 32 that generates GPR signals that are to be transmitted into the medium, a GPR transmitter 34 that transmits the generated GPR signals into the medium, and a GPR receiver 36 that receives reflected GPR signals from the medium. As identified above, the received GPR signals are automatically processed to estimate the location and depth of objects within the medium. In some embodiments, this processing can be performed onboard the GRP device 12 by a computing component of the device, such as the central controller 30. In such a case, the component can comprise a non-transitory computer-readable medium that stores an estimation program comprising computer-executable instructions, for example comprised by one or more algorithms, which can be executed by a processor of the component to automatically estimate in real time the object's location and depth from the received GPR signals. Examples of such estimation are described in the discussion that follows. While such estimation has been identified as being performed by and on the GPR device 12, it is noted that the received GPR signals can be provided to a separate computing component, such as an independent computing device, that can perform such estimation.

Figure 3A:
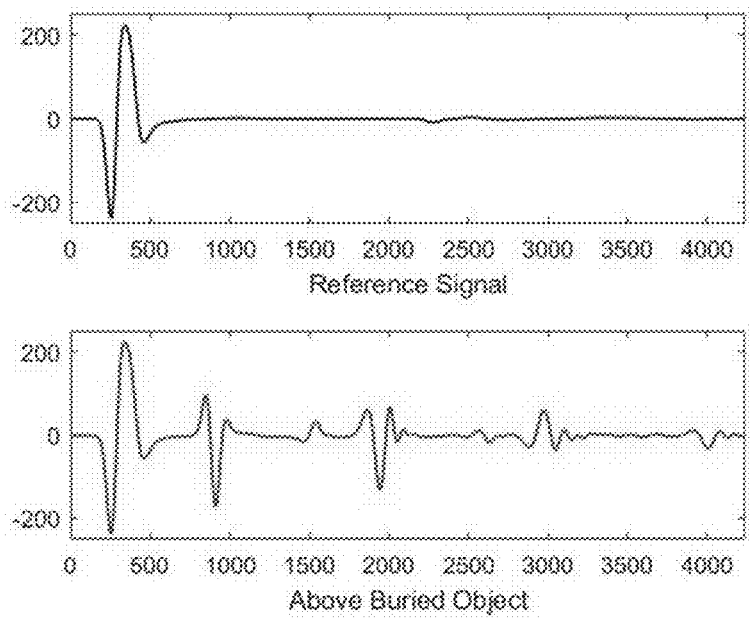
FIG. 3A includes graphs of an example reference GPR signal (top) and an example GPR signal captured above a buried object (bottom).
Figure 3B:
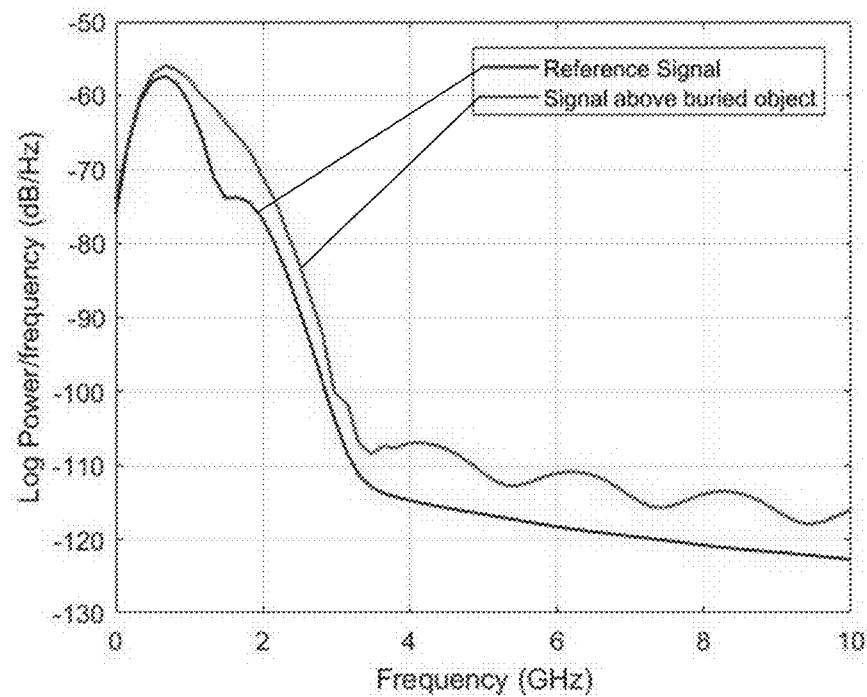
FIG. 3B is a graph that plots Welch power spread density (PSD) estimates for the GPR signals of FIG. 3A.

FIG. 3A shows examples of GPR signals of the type that can be captured using a GPR device, such as the GPR device 12. More particularly, FIG. 3A shows a reference signal (top) generated from an object-free location and a test signal (bottom) from a location directly above a buried object. FIG. 3B shows PSD estimates for each of the GPR signals of FIG. 3A and reveals how different their PSD estimates are.

The PSD estimates shown in FIG. 3B, as well as other PSD estimates described herein, were determined using the Welch method. The general procedure behind Welch's method is to first segment a signal $x=(x_1, \ldots x_T)$ of length T into K overlapped segments of size M. Then, for each segment, a windowed discrete Fourier transform (DFT) is computed at some frequency $$v = j/M \text{ with } -(M/2-1) \leq j \leq M/2: \quad (1)$$

$$X_k(v) = \sum_m x(m)w(m)\exp(-j2\pi vm)$$

where S is the number of points to shift between segments, $w(m)$ is the Hamming window function, and $m=(k-1)S, \ldots, M+(k-1)S-1$. Next, the modified periodogram value is computed from the discrete Fourier transform for each segment:

$$P_k(v) = \frac{1}{W}|X_k(v)|^2, k = 1, \ldots < K, \quad (2)$$

where $$W = \sum_{m=1}^{M} w^2(m).$$

Welch's estimate of the PSD is then obtained by averaging the periodogram values:

$$S_x(v) = \frac{1}{K}\sum_{k=1}^{K} P_k(v) \quad (3)$$

Figure 4A:
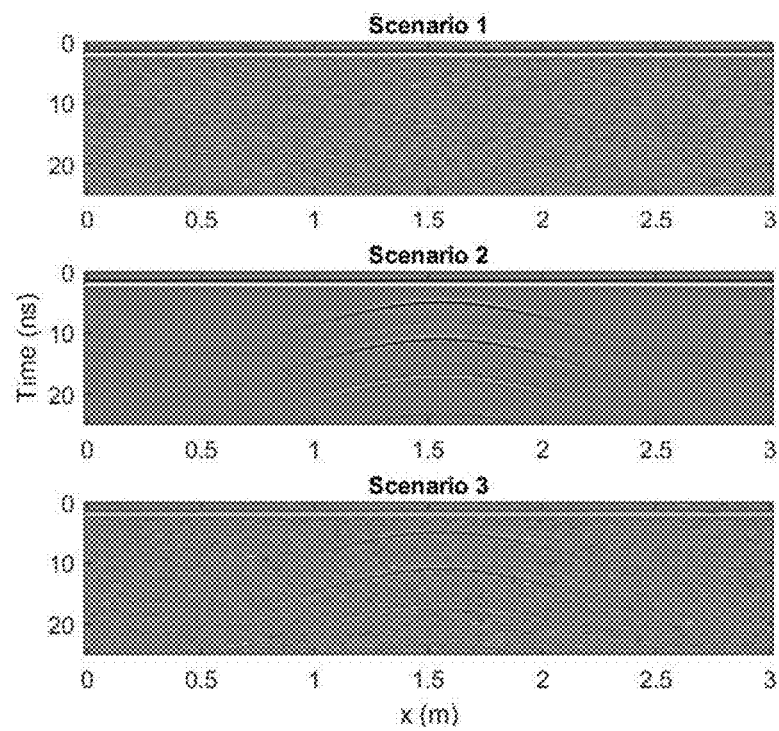
FIG. 4A includes graphs of example GPR profiles for each of three different scenarios: Scenario 1, Scenario 2, and Scenario 3.

FIG. 4A shows GPR profiles for three different scenarios that were used to statistically evaluate the performance of the disclosed systems and methods. In this evaluation, 20 cases of two-dimensional synthetic models were generated for three different scenarios. In Scenario 1, there was no buried object but the GPR signals included noise and random outliers. In Scenario 2, a water-filled PVC pipe with wall thickness of 3 mm and inner diameter of 10 cm was buried in sand at a random location and depth. The GPR signals were free from noise and outliers in this scenario. In Scenario 3, noise was added to the cases in Scenario 2 to imitate a more realistic setting. The additive noise was considered to be a combination of white noise with Gaussian distribution, a signal-to-noise ratio of 25 dB, and random outliers. These two-dimensional synthetic models were created using the FDTD gprMax code. All materials are considered to be homogeneous (see Table 1). The transmitted pulse was an 800 MHz Ricker wavelet with an antenna offset of 14 cm and a trace interval of 2.5 cm.

TABLE 1

| Material properties | | |
|---|---|---|
| Media | Relative permittivity | Electrical conductivity (mS/m) |
| Soil | 5 | 1 |
| PVC pipe | 3 | 1 |
| water | 80 | 1 |

Figure 4B:
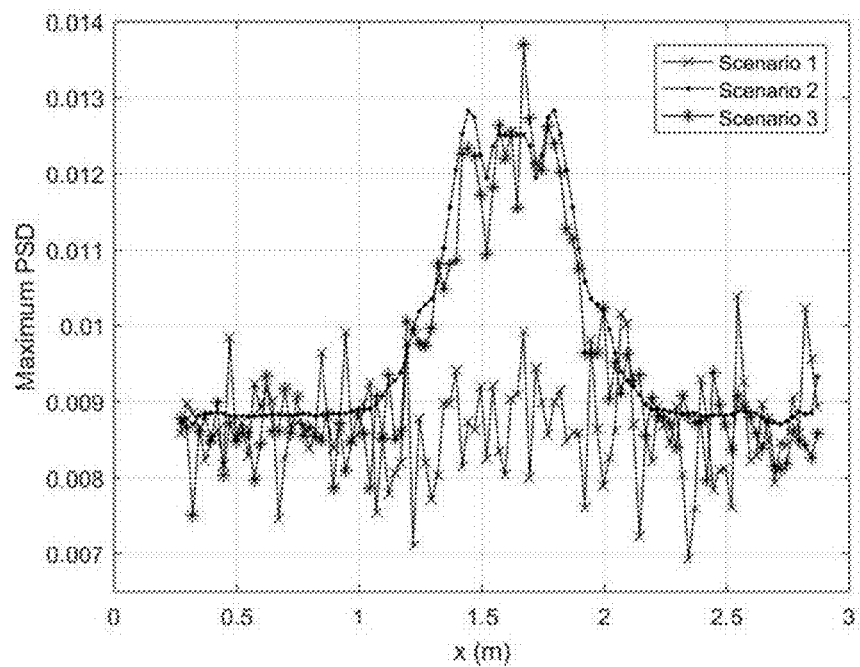
FIG. 4B is a graph that plots maximum PSD values for a Case #6 for each of the GPR profiles of FIG. 4A.

The GPR profiles in FIG. 4A were taken from a Case #6 for each of the three experimental scenarios. The maximum PSD is plotted for each of the three GRP profiles in FIG. 4B. As can be appreciated from FIG. 4B, the presence of a buried object (Scenarios 2 and 3) is detectable using the maximum PSD because there is an increasing pattern to the maximum PSD values as one approaches the object. The maximum energy of GPR signals from the object-free locations (Scenario 1), however, have constant maximum PSD values with only minor deviations due to noise.

To detect a buried object and estimate its location and depth, GPR signals are captured at various locations along the surface of the medium under evaluation. During this process, object-free locations are first scanned for reference. For example, three object-free locations can be scanned and their GPR signals are recorded. Once these signals have been recorded, scanning can proceed by scanning target areas and computing the maximum energy of the new locations using Equation (3). The more similar the signals are to the reference signal, the closer their energy is. This also means that the medium is object-free at least to some fair distance away from the current location. As scanning continues and the GPR device gets closer to a location of a buried object, however, the maximum PSD values gradually increase. The potential burial location is the near the location at which a peak of the maximum PSD occurs. Investigation of neighboring locations reveals a hyperbolic signature (see FIG. 4B), which is useful to estimation of the location and depth of the buried object.

The general procedure for detecting a buried object having been described above, an explicit statistical approach to detecting a buried object will now be discussed. The procedure is a real-time sequential control process that monitors GPR signals as they are recorded.

Suppose $x_n = (x_n^1, x_n^2, \ldots, x_n^T)$ is the $n^{th}$ captured GPR signal where $x_1$, $x_2$, and $x_3$ are recorded from object-free (reference) locations. Assume $p_n$ is the maximum PSD of the $n^{th}$ recorded signal computed using Equation (3). Let $\bar{p}_n^4$ represent the window average of the last 4 maximum PSD values given by $$\bar{p}_n^4 = \frac{1}{4} \sum_{i=n-3}^{n} p_i \tag{4}$$

and let $\bar{p}_n^{25}$ represent the window average of the last 25 maximum PSD values given by $$\bar{p}_n^{25} = \frac{1}{25} \sum_{i=n-24}^{n} p_i \tag{5}$$

where the average of 25 is computed for the available values in the beginning of the process and is shown by $\bar{p}_n^n$.

Theorem: As soon as the $n^{th}$ signal is recorded, the following decision boundary detects underground objects with probability 0.999 for $n \geq 25$:

$$\bar{p}_n^4 > \bar{p}_n^{25} + u_n^{25} \tag{6}$$

where $$u_n^{25} = t(24, 0.999) S_n^{25} \left( \frac{21}{25^2} \right) \left( 1 + \frac{21}{4^2} \right) \tag{7}$$

For $4 \leq n \leq 24$, the following boundary detects underground objects with the same probability:

$$\bar{p}_n^4 > \bar{p}_n^n + u_n^n \tag{8}$$

where $$u_n^n = t(n-1, 0.999) S_n^n \left( \frac{n-4}{n^2} \right) \left( 1 + \frac{n-4}{n^2} \right) \tag{9}$$

The proof of the above theorem is as follows. Under the hypothesis that there is nothing buried nearby, the window average of 25 and 4 have the same expected value, that is $$E(\bar{P}_n^4) = \mu^4 = \mu^{25} = E(\bar{P}_n^{25}) \tag{10}$$

However, by approaching object locations, the window average of 4 increases promptly while the window average of 25 increases gradually. To detect this change as quickly as possible, one is testing the following statistical hypothesis at each step of the process:

$$H_0: \mu^4 = \mu^{25} \text{ Vs } H_1: \mu^4 > \mu^{25} \tag{11}$$

where $\mu^4$ is the true mean of the window average of 4 maximum PSD values and $\mu^{25}$ is the mean of the window average of 25 maximum PSD. The test statistic is $(\bar{P}_n^4 - \bar{P}_n^{25})$ which is unbiased under the null-hypothesis:

$$E(\bar{P}_n^4 - \bar{P}_n^{25}) = 0 \tag{12}$$

and has the following variance $$\text{Var}(\bar{P}_n^4 - \bar{P}_n^{25}) = \sigma^2 \left( \frac{21}{25^2} \right) \left( 1 + \frac{21}{4^2} \right) \tag{13}$$

where $\text{Var}(\bar{P}_n^n) = \sigma^2/n$. Thus, using the central limit theorem, one has $$\frac{(\bar{P}_n^4 - \bar{P}_n^{25})}{\sigma^2 \left( \frac{21}{25^2} \right) \left( 1 + \frac{21}{4^2} \right)} \approx N(0, 1) \tag{14}$$

By estimating $\sigma^2$ using the last 25 observations, one has $$\frac{(\bar{P}_n^4 - \bar{P}_n^{25})}{S_n^{25} \left( \frac{21}{25^2} \right) \left( 1 + \frac{21}{4^2} \right)} \approx t(n-1) \tag{15}$$

where $$S_n^{25} = \sqrt{\frac{1}{24} \sum_{i=n-24}^{n} (p_i - \bar{p}_n^{25})^2} \tag{16}$$

Thus, using a t-distribution confidence interval, when an object is buried underground one has $(\bar{p}_n^4 - \bar{p}_n^{25}) > u_n^{25}$, where $$u_n^{25} = t(24, 0.999) S_n^{25} \left( \frac{21}{25^2} \right) \left( 1 + \frac{21}{4_2} \right) \tag{17}$$

As long as $(\bar{p}_n^4 - \bar{p}_n^{25}) \leq u_n^{25}$, the process is under control and the probability of not detecting a change equals 0.001, which is related to the selected t-distribution critical value.

The computational steps involved in the above-described theorem are as follows:

(1) As soon as $x_n$ ($n \geq 4$) is recorded, its maximum PSD is computed along with the window average of four ($\bar{p}_n^4$) and the window average of 25 ($\bar{p}_n^{25}$ or $\bar{p}_n^n$ when applicable).

(2) A one-sided t-distribution confidence interval (0, $\bar{p}_n^{25} + u_n^{25}$) is generated using Equation (7). When there are less than 25 observations, this interval is computed as (0, $\bar{p}_n^n + u_n^n$) using Equation (9).

(3) If $\bar{p}_n^4 \leq \bar{p}_n^{25} + u_n^{25}$ (or $\bar{p}_n^4 \leq \bar{p}_n^n + u_n^n$ when applicable), the process is under control and the chance of failure in detection is 0.001. Otherwise, a warning is issued and a buried object is detected ahead. In this case, the average $\bar{p}_n^4$ keeps increasing by approaching the buried object.

(4) Scanning and monitoring target areas continues after a local peak of $\bar{p}_n^4$ is achieved. This peak happens around a highly probable burial site, $x_n(a \leq n \leq b)$.

(5) A hyperbola is mapped and tracked for signals of the probable burial site through analytic searching. The location of the buried object is estimated to be the location of the apex of the hyperbola.

(6) A least-square approach is then used to approximate the velocity of the GPR signal using the marked nodes on the diffracted hyperbola in step 5. Then, the one-way travel time of the wave at the estimated location of the object is multiplied by the velocity to estimate the depth. A zero-time correction is applied beforehand where the zero-time is estimated using the potential burial site signals.

(7) The above process is repeated for all the local peaks of $\bar{p}_n^4$ for detecting multiple objects.

Figure 5A:
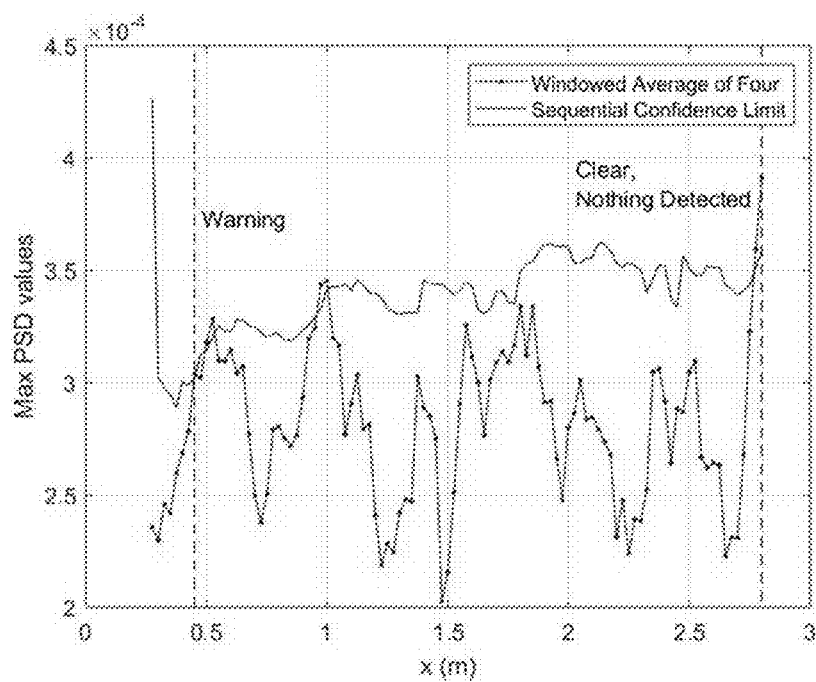
FIGS. 5A-5C are graphs that plot maximum PSD values for Case #6 for Scenarios 1, 2, and 3, respectively.
Figure 5B:
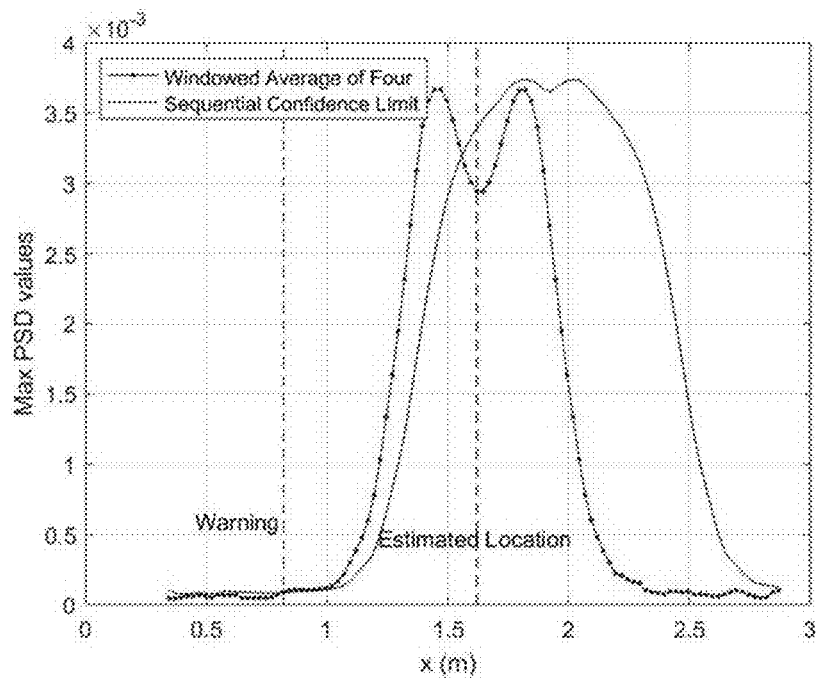
Figure 5C:
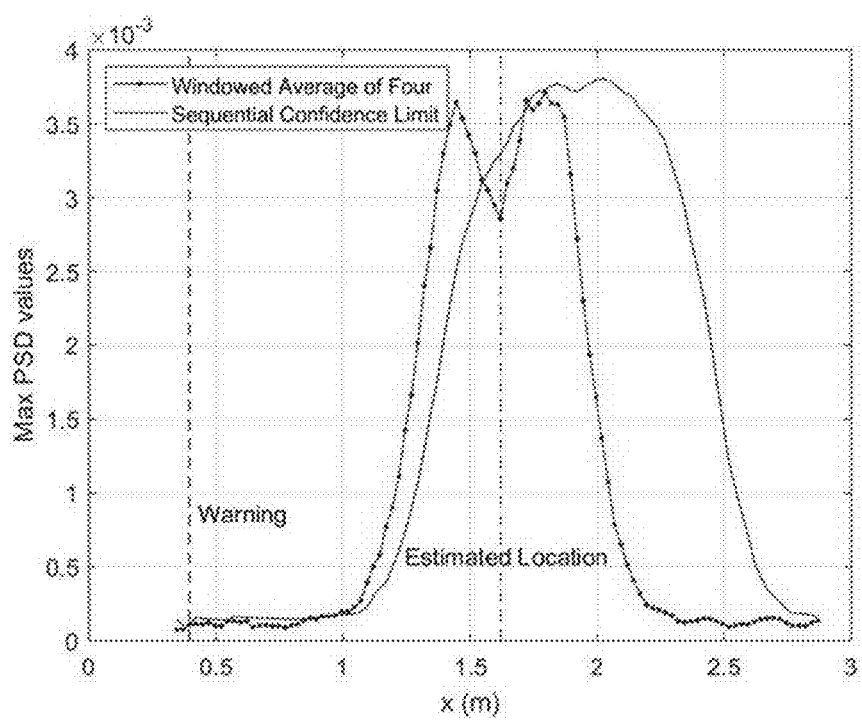

FIGS. 5A-C show the decision process using the above-described approach for Case #6 in the three experimental scenarios. In Scenario 1, where there was nothing buried, the confidence limit had some fluctuations. There are a few observations outside the confidence limit due to noise, which triggers a warning but overall the change in maximum PSD is insignificant and does not create a significant peak of maximum PSD values. In Scenario 2 however, the confidence limit increases due to a significant increase of signal's energy. In this case, a warning alarm was generated at x=0.820 m, and the location and depth of the buried object were estimated to be 1.62 m and 0.224 m, respectively. The true location of the object was 1.62 m and the depth was 0.23 m. Scenario 3 generated roughly the same curve as Scenario 2 because the PSD approach handles the additive noise quite well. An alarm was generated at x=0.395 m and the location and depth of the object were estimated to be 1.62 m and 0.223 m, respectively.

Table 2 represents the overall performance of the 20 experimental cases in Scenarios 2 and 3. All 20 cases of Scenario 1 successfully generated a "nothing detected" notification, while all cases in Scenarios 2 and 3 detected a buried object. For cases in Scenario 2, a detection alarm was generated on average at least 90 cm prior to reaching the object. The mean absolute error (MAE) and root mean square error (RMSE) for were 0.47 cm and 0.73 cm, respectively, meaning that, on average, the error in estimating lateral location was 0.47 cm. The RMSE is a wellness of fit measure that includes both the estimation bias and variance. The depth in this scenario was estimated with an MAE of 1.80 cm and an RMSE of 2.30 cm. For cases in Scenario 3, a detection alarm was issued at least 94 cm ahead of the location at which the object was buried. The MAE and RMSE for location estimation were 0.375 cm and 0.602 cm, respectively. The depth estimation had an MAE of 2.027 cm and an RMSE of 2.837 cm.

TABLE 2

Mean Absolute Error (cm) and Root Mean Square Error (cm) of the max PSD analytics in 20 simulated cases for two scenarios

| | | Location | | Depth | |
|---|---|---|---|---|---|
| Scenario | Detection | MAE | RMSE | MAE | RMSE |
| Scenario 2 | 89.975 | 0.474 | 0.725 | 1.797 | 2.299 |
| Scenario 3 | 93.975 | 0.375 | 0.602 | 2.027 | 2.837 |

In addition to the synthetic modeling, real-world testing was performed to assess the performance of the proposed analytics in real life. First, a dataset was collected over a sand test site in which multiple buried pipes and tree roots existed. A MALA ProEx GPR device with 800 MHz shielded antenna was used to probe the ground where two PVC pipes with a wall thickness of 3 mm and a radius of 4.1 cm were buried 35 cm below the surface at 1.2 m and 5.2 m. Beside the pipes were two tree roots at 7.8 m and 9.1 m. Hyperbolic responses were observed for each of these buried objects. Second, a portion of a long GPR profile collected along on a road using the same equipment was utilized to illustrate a complex environment. The study area was part of a main road covered with asphalt and encompassing different utilities and drainage channels.

Figure 6A:
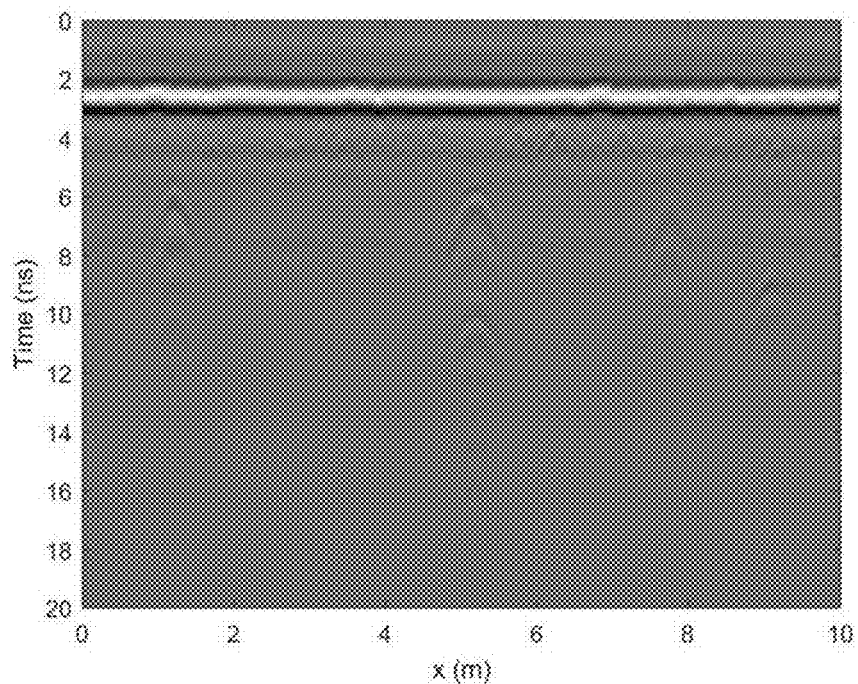
FIG. 6A is a GPR profile captured over a pipe site.
Figure 6B:
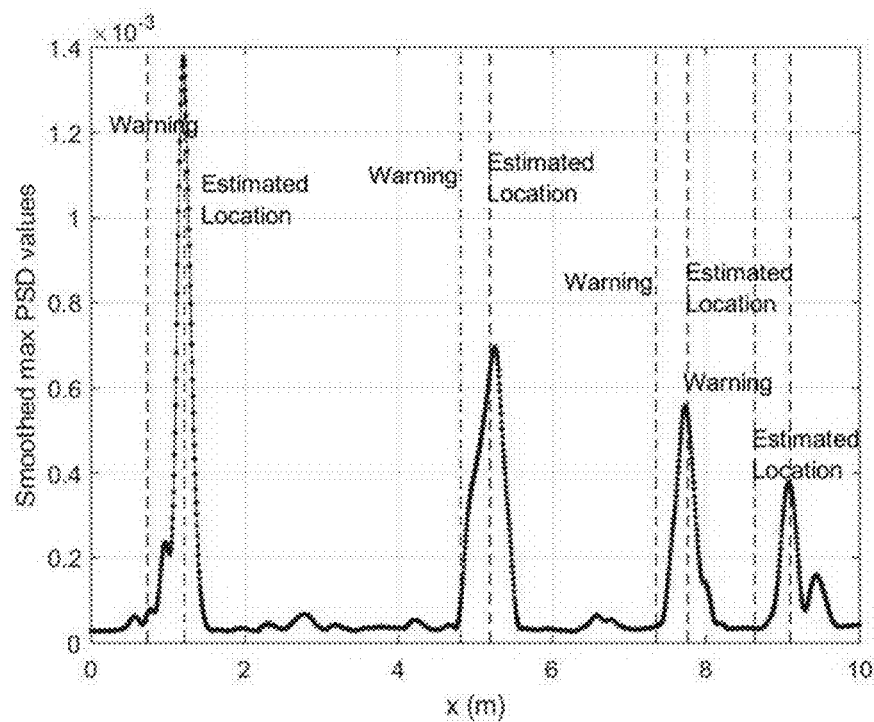
FIG. 6B is a graph that plots smoothed maximum PSD values for the GPR profile of FIG. 6A.

As expected, the proposed analytics performed well on real-life data with multiple buried objects. FIG. 6A shows the GPR profiles and FIG. 6B shows the associated maximum PSD values. The PSD values were smoothed using a moving average of 21 that was selected by experimenting on the synthetic data. The location of the objects were estimated to be x=1.216 m, 5.201 m, 7.761 m, and 9.065 m with corresponding depths of 0.353 m, 0.282 m, 0.387 m, and 0.430 m.

Figure 7A:
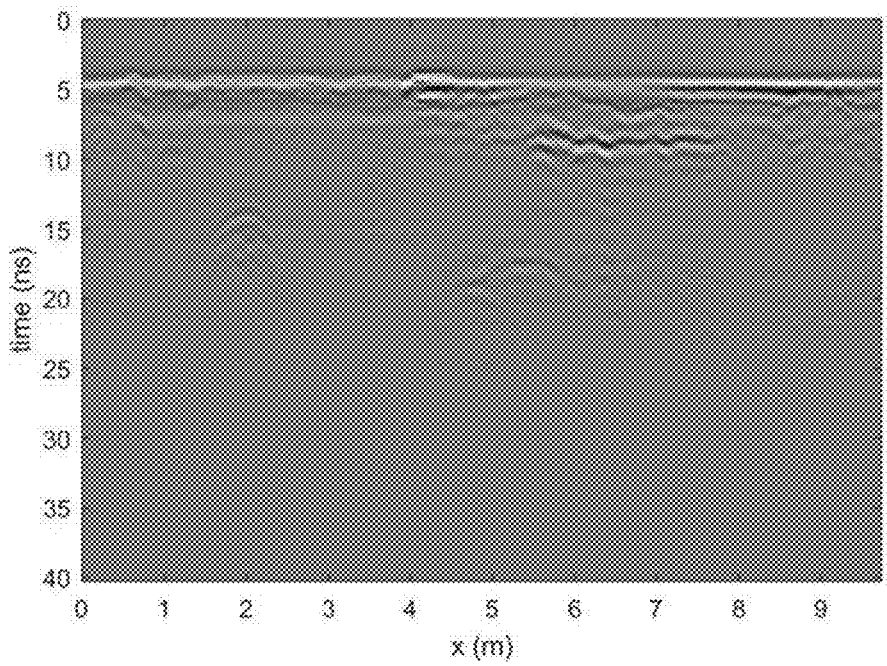
FIG. 7A is a GPR profile captured on asphalt.
Figure 7B:
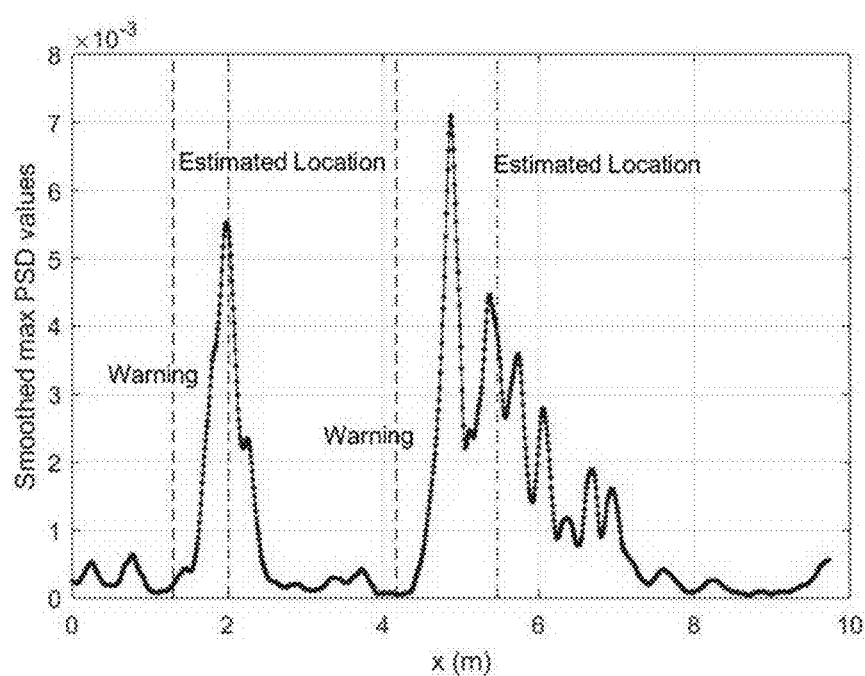
FIG. 7B is a graph that plots smoothed maximum PSD values for the GPR profile of FIG. 7A.

FIG. 7A shows the GPR profile and FIG. 7B shows the smoothed maximum PSD values along with the generated warning and estimated locations for the second real dataset. The location and depth of the first object was estimated to be at 2.007 m and 0.541 m, respectively. The second object was estimated to be at 5.465 m at a depth of 0.779 m. Performance of the analytics in this multiple-object case is remarkable considering the level of distortion and noise in the data. Normally, alternate detection methods fail to detect objects in such real-world cases due to severe distortions in the GPR signal. However, the disclosed method successfully detected the objects and performed valid depth estimation using imperfect hyperbolic signatures. The exact locations and depths in this real experiment are unknown but the results match expert expectations. There is a high sharp peak at 4.90 m in the smoothed maximum PSD graph that could be a result of mixed energies of two densely spaced anomalies. In this case, the analytics estimated the local maximum of the smoothed PSD values occurring around 4.90 m and tracked the trace of the hyperbola using a custom window search to reach its peak at 5.41 m.

To compare the results of the proposed analytics with other methods, it is noteworthy to mention that no other study has reported statistical measures of performance such as MAE and RMSE, as presented here. The main performance measure reported by other studies is the detection accuracy, which is calculated as the percentage of correct object detections. To that extent, the disclosed method had 100% success in detecting the subsurface anomalies in all cases of synthetic and real data used in this research.

In summary, a statistical analytical monitoring scheme is disclosed that utilizes maximum energy of GPR signals to detect hidden buried objects and estimate their locations as well as their depths. The computations are performed instantly and, therefore, can be performed in real time. An alert is set to warn the user when a potential burial site is detected ahead by setting a threshold on the maximum PSD values. The site could be detected at least 44 cm ahead on average and the threshold was set using a t-distribution. Sensitivity of the alert process can be changed by changing the threshold. A window average of four maximum PSDs for checking in/out of control states was utilized since four samples cut the length of the interval in half. The next window size that has significant effect on the length is nine. A window average of 25 maximum PSDs has been used to create confidence limits by considering the central limit theorem and approximate t-distribution for the average.

Figure 8A:
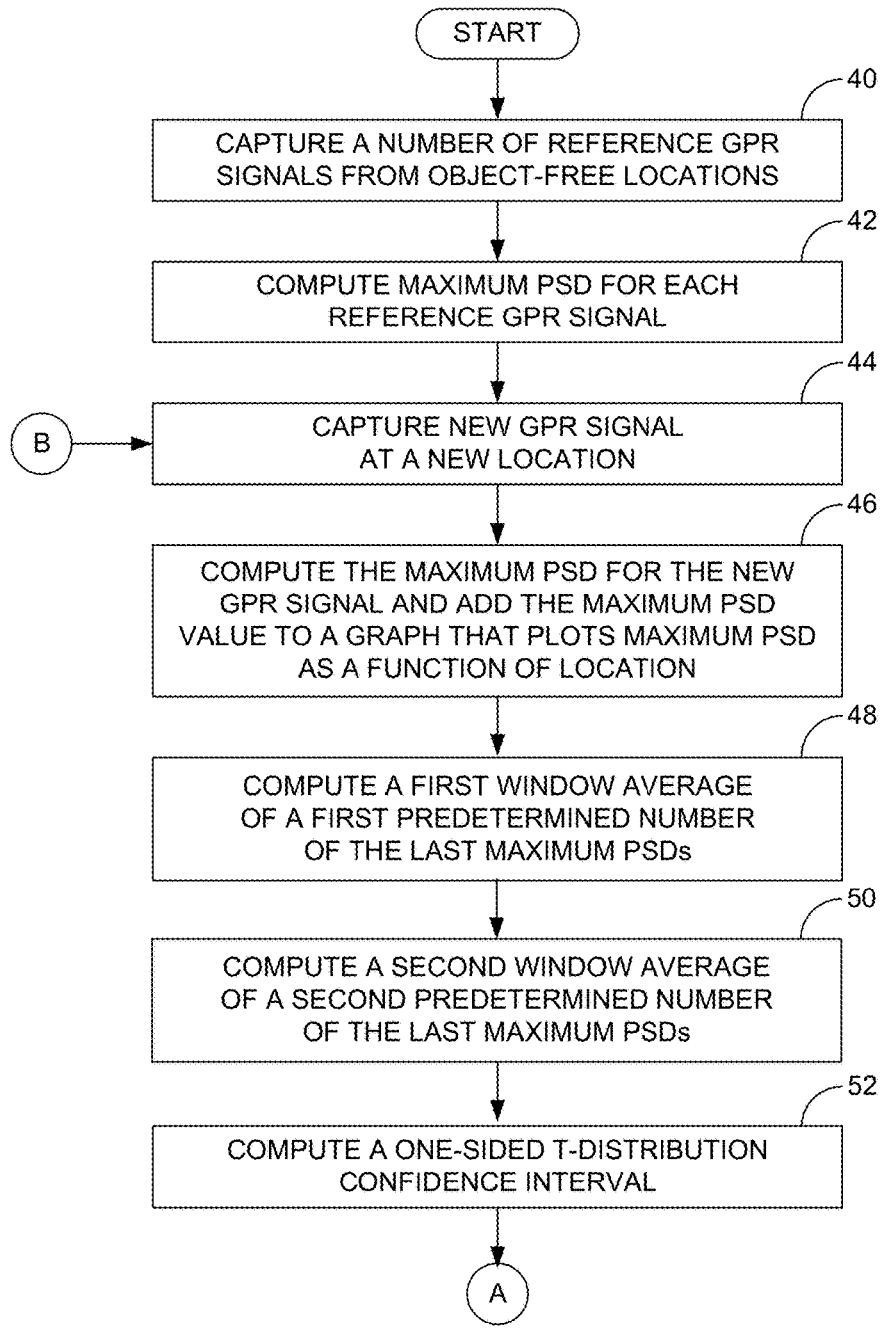
FIGS. 8A and 8B together comprise a flow diagram of an embodiment of a method for detecting buried objects.
Figure 8B:
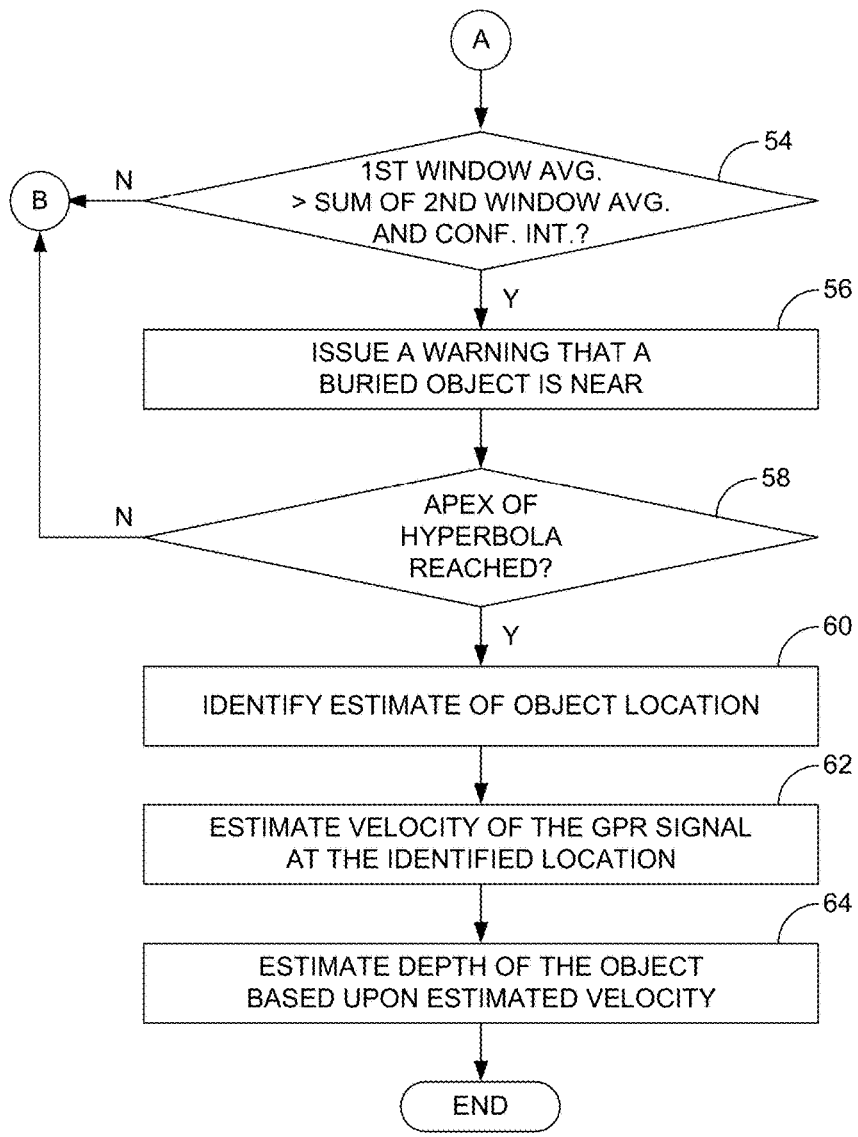

FIGS. 8A and 8B present a flow diagram of an embodiment of a method for detecting a buried object that is consistent with the above disclosure. Beginning with block 40 of FIG. 8A, a number of reference GPR signals are captured from object-free locations. As described above, the number of reference GPR signals captured, and therefore the number of reference locations sampled, can a small number.

As an example, 1 to 5 reference GPR signals (e.g., 3 signals) can be captured. Irrespective of the number of reference GPR signals that are captured, each signal can, for example, be obtained from a location positioned along a line traversed by the GPR device. Referring to block 42, the maximum PSD is computed for each captured reference GPR signal. As described above, the PSD can be computed using Equation (3).

Once the reference signals have been captured, test signals can then be captured. Accordingly, as indicated in block 44, a new GPR signal is captured at a new location. This location can, for example, be a position farther along the same line from which the reference GPR signals were captured. With reference to block 46, the maximum PSD for the new GPR signal is computed and that maximum PSD value is added to a graph that plots maximum PSDs as a function of location. While a graph can literally be plotted, it is noted that no graph need actually be generated in a format that the user can review. Accordingly, the "plotting" of the "graph" can be a completely internal computation performed by the software.

Once at least one test GPR signal has been captured, a first window average of a first predetermined number of the last maximum PSDs is computed, as indicated in block 48, and a second window average of a second predetermined number of the last maximum PSDs is computed, as indicated in block 50. As described above in reference to the simulations that were performed, the first predetermined number can be smaller than the second predetermined number. In keeping with the provided example, the first window average can be the average of the last 4 maximum PSDs and the second window average can be the average of the last 25 maximum PSDs (or a smaller number of the last maximum PSDs if fewer than 25 GPR signals have been captured at that point). Notably, other numbers of maximum PSDs can be used, if desired. These two window averages can be calculated using Equations (4) and (5), respectively.

Referring next to block 52, the one-sided t-distribution confidence interval is computed. As described above, this confidence interval can be computed using Equation (7) if 25 or more GPR signals have been captured, or Equation (9) if less than 25 GPR signals have been captured. At this point, a first window average of maximum PSDs, a second window average of maximum PSDs, and a confidence interval have each been computed. Once these values have been obtained, they can be used to make a determination as to the potential proximity of a buried object. To do this, it is determined whether or not the first window average is greater than the sum of the second window average and the confidence interval, as indicated in decision block 54 of FIG. 8B. If not, the maximum PSD has not increased significantly and, therefore, it is unlikely that a buried object is near. In such a case, flow returns to block 44 of FIG. 8A and another new GPR signal is captured at the next location. If, on the other hand, the first window average is greater than the second window average plus the confidence interval, the GPR signal has significantly increased and it is, therefore, likely that the GPR device is approaching a buried object. In such a case, flow continues to block 56 of FIG. 8B and an alert is issued to the user to warn the user as to this likelihood prior to the capture of the next GPR signal in block 44. Such an alert can, for example, take the form of a displayed message and/or an audible signal generated with the user interface of the GPR device.

The scanning and monitoring process described above continues as the GPR device reaches new locations along the surface of the medium under evaluation. As GPR signals are captured, new maximum PSDs are computed and plotted as a function of location. Assuming the GPR device is moving toward a buried object, the maximum PSDs will continue to increase and the computed maximum PSD values will plot a curve having the upward trajectory of the leading side of a hyperbola of the type shown in the examples of FIGS. 5B and 5C. The curve will continue to increase until forming an apex of the hyperbola, which coincides with the estimated location of the buried object. Accordingly, with reference to decision block 58, it is determined whether or not the apex of the hyperbola has been reached. If not, flow again returns to block 44 of FIG. 8A and another new GPR signal is captured at the next location. If so, however, an estimate of the object location is identified, as indicated in block 60. This location can, for example, be communicated to the user with a further displayed message and/or audible signal.

Once the estimated location of the buried object is known, the depth of the object can be estimated. With reference to block 62, the velocity of the GPR signals in reaching the buried object and returning to the GPR device is estimated. As noted above, this velocity can be estimated using a least squares approach. Once the velocity has been estimated, the depth of the object can be estimated based upon that velocity, as indicated in block 64.

To summarize the above flow diagram, a medium under evaluation is scanned with a GPR device so as to capture GPR signals at discrete locations along the surface of the medium. As the GPR signals are captured, their maximum energy values (e.g., PSDs) are computed and are monitored to determine, using statistical analysis that considers window averages of the maximum energy values and confidence intervals, whether or not the maximum energy values are increasing as the surface of the medium is traversed. If a significant increase in the maximum energy value is observed, an alert is issued that there may be a nearby buried object. As scanning and monitoring continues, it is determined when an apex of a hyperbola formed by plotting the maximum energy values as a function of location is reached and the location associated with that apex is designated as the estimated location of the object. The depth of the object is then determined by first estimating the velocity of the GPR signals at that location and then estimating the depth from the estimated velocity.

In the foregoing disclosure, maximum energy values, in the form of maximum PSDs, are computed and monitored to determine if a buried object is near. It is noted, however, that, in other embodiments, other parameters of the captured GPR signals can be computed and monitored for this purpose. For example, dynamic time warping (DTW) values derived from the GPR signals can be computed and monitored. DTW algorithms align two signals in the time dimension by creating a so-called "warping path" and determine a measure of their dissimilarity independent of certain non-linear variations. This alignment method provides a powerful tool in signal classification, aiming to group similar signals based on their distance. Given two signals $A=(a_1, \ldots a_n)$ and $B=(b_1, \ldots b_m)$ not necessarily with equal length, the DTW process starts by constructing an n×m matrix in which the element of the $(i, j)^{th}$ component corresponds to the following squared Euclidian distance $$d(a_i, b_j) = (a_i - b_k)^2 \tag{18}$$

The process then continues by retrieving a path through the matrix that minimizes the total cumulative distance between the two signals. Specifically, the optimal path is found by minimizing the warping cost given by $$DTW(A, B) = \sqrt{\sum_{k=1}^{K} d_k} \qquad (19)$$

where $d_k$ is the $k^{th}$ element of the warping path. The optimal path is found using an iterative method. The general procedure to detect hidden buried objects using DTW is as follows:
  (a) Three object-free locations are scanned with GPR and the average of their signals is considered as the reference signal for the current under investigation ground.
  (b) Proceed by scanning target areas and computing the DTW distance of the new locations with the reference signal. The more similar the signals are to the reference signal, the smaller their distance value. Setting a threshold on the computed sequential dissimilarity measures assists in detecting potential burial sites.
  (c) The DTW values increase gradually by getting closer to a site with buried objects. Finding a site where a local peak of DTW happens and investigating the surrounding locations to trace a hyperbola will lead to a highly probable burial location.

Figure 9A:
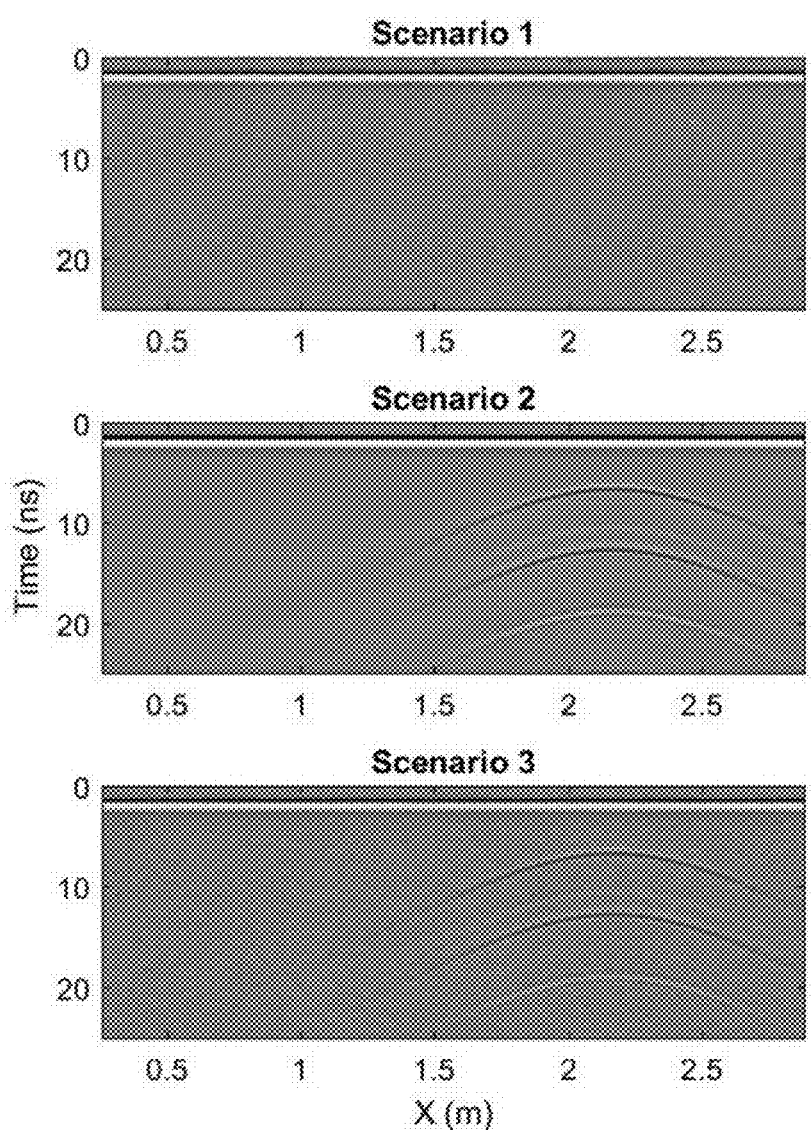
FIG. 9A includes graphs of example GPR profiles for each of the three different scenarios.
Figure 9B:
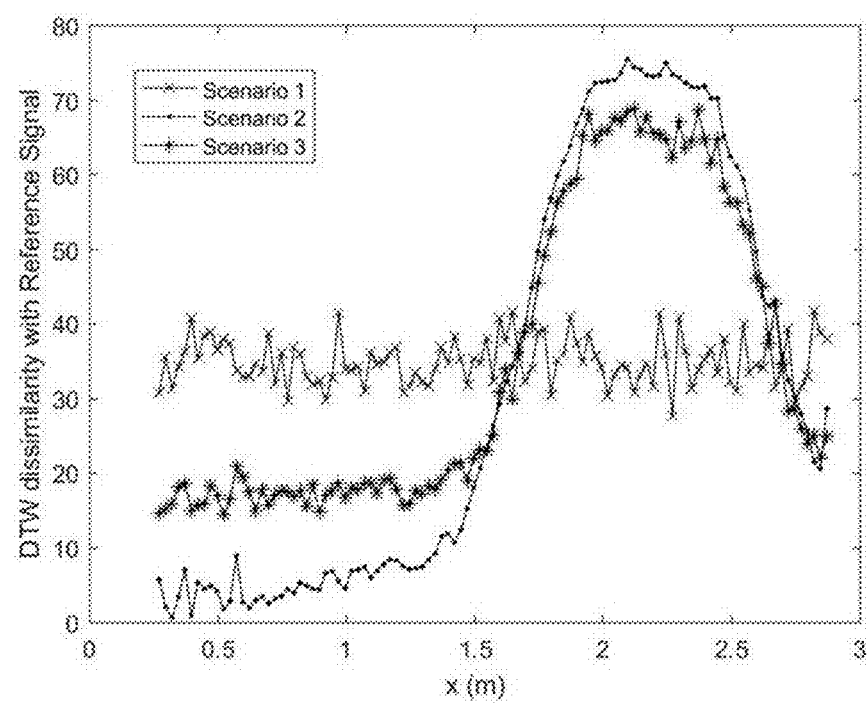
FIG. 9B is a graph that plots dynamic time warping values for a Case #7 for each of the GPR profiles of FIG. 9A.

A graph of the computed dissimilarity measures for Case #7 in the three experimental scenarios along with the profiles is shown in FIG. 9. As above, the object-free locations (Scenario 1) have similar signals to the reference signals since their DTW value randomly fluctuates. Getting closer to the buried object results in higher signal dissimilarity and higher DTW value in the Scenarios 2 and 3. The increasing pattern in DTW values are detectable even in the noisy environment of Scenario 3.

As can be appreciated from the above discussion, in both the PSD-based method and the DTW-based method, a parameter based on the captured GPR signal and indicative of the proximity of a buried object is computed for each location and that parameter is monitored to determine whether or not it significantly increases. In addition, in both methods, the parameter is plotted and the location at which an apex of a hyperbola occurs is designated the estimated location of the buried object.

The invention claimed is:

1. A method for detecting buried objects, the method comprising:
  receiving ground penetrating radar (GPR) signals captured at discrete locations along a surface of a medium in which an object may be buried;
  computing a maximum power spectral density (PSD) value for each received GPR signal, the maximum PSD values being indicative of the proximity of a buried object;
  plotting the computed maximum PSD values as a function of location along the surface of the medium;
  determining an apex of a hyperbola that results from the plotting of the computed maximum PSD values; and
  designating a location along the surface of the medium at which the apex occurs as an estimated location of the buried object.

2. The method of claim 1, wherein computing a maximum PSD value for each received GPR signal comprises segmenting each GPR signal into segments, computing a windowed discrete Fourier transform (DFT) for each segment, computing a periodogram value from the DFT for each segment, and then averaging the periodogram values.

3. The method of claim 1, further comprising monitoring the computed maximum PSD values to determine when the computed maximum PSD values significantly increase and, when that occurs, issuing an alert to a user that a buried object may be near.

4. The method claim 3, wherein monitoring the computed maximum PSD values comprises performing statistical analysis on the maximum PSD values that considers window averages of the maximum PSD values and confidence intervals to determine whether or not the maximum PSD values are increasing as the surface of the medium is traversed.

5. The method of claim 4, wherein performing statistical analysis comprises computing a first window average of a first predetermined number of the maximum PSD values, computing a second window average of a second predetermined number of the maximum PSD values, wherein the first predetermined number is smaller than the second predetermined number.

6. The method of claim 5, wherein performing statistical analysis further comprises computing a confidence interval.

7. The method of claim 6, wherein performing statistical analysis further comprises determining if the first window average is greater than the sum of the second window average and the confidence interval and, if so, issuing the alert.

8. The method of claim 1, further comprising estimating a depth of the buried object at the estimated location.

9. The method of claim 8, wherein estimating a depth comprises estimating a velocity of the GPR signals at the estimated location and estimating the depth based upon the estimated velocity.

10. A system for detecting buried objects, the system comprising:
  a ground penetrating radar (GPR) device configured to capture GPR signals at discrete locations along a surface of a medium in which an object may be buried; and
  a computing component configured to compute a maximum power spectral density (PSD) value for each received GPR signal, the maximum PSD values being indicative of the proximity of a buried object, to plot the computed maximum PSD values as a function of location along the surface of the medium, to determine an apex of a hyperbola that results from the plotting of the computed maximum PSD values, and to designate a location along the surface of the medium at which the apex occurs as an estimated location of the buried object.

11. The system of claim 10, wherein the computing component is further configured to monitor the maximum PSD values to determine when the maximum PSD values significantly increase and, when that occurs, issuing an alert to a user that a buried object may be near.

12. The system claim 11, wherein the computing component is configured to perform statistical analysis on the maximum PSD values that considers window averages of the maximum PSD values and confidence intervals to determine whether or not the maximum PSD values are increasing as the surface of the medium is traversed.

13. The system of claim 10, wherein the computing component is further configured to estimate a depth of the buried object at the estimated location.

14. The system of claim 10, wherein the computing component is integrated into the GPR device.

15. A non-transitory computer readable medium that stores an estimation program comprising computer-executable instructions configured to:
  receive ground penetrating radar (GPR) signals captured at discrete locations along a surface of a medium in which an object may be buried;

compute a maximum power spectral density (PSD) value for each received GPR signal, the maximum PSD values being indicative of the proximity of a buried object;

plot the computed maximum PSD values as a function of location along the surface of the medium;

determine an apex of a hyperbola that results from the plotting of the computed maximum PSD values; and designate a location along the surface of the medium at which the apex occurs as an estimated location of the buried object.

* * * * *